United States Patent [19]

Erdmannsdoerfer et al.

[11] Patent Number: 5,707,521
[45] Date of Patent: Jan. 13, 1998

[54] FILTER ELEMENT HAVING A NONWOVEN LAYER AND A PERMEABLE SHRINK TUBE

[75] Inventors: Hans Erdmannsdoerfer, Dobel; Bruno Sommer, Ludwigsburg, both of Germany

[73] Assignee: Filterwerk Mann & Hummel GmbH, Ludwigsburg, Germany

[21] Appl. No.: 631,329

[22] Filed: Apr. 12, 1996

[30] Foreign Application Priority Data

Apr. 13, 1995 [DE] Germany .................. 195 14 025.7

[51] Int. Cl.⁶ ........................................ B01D 27/04
[52] U.S. Cl. ............................... 210/489; 210/497.01
[58] Field of Search .................. 55/486, 498, 520, 55/524; 210/488, 489, 497.01

[56] References Cited

U.S. PATENT DOCUMENTS

| | | |
|---|---|---|
| 3,334,752 | 8/1967 | Matravers . |
| 4,156,601 | 5/1979 | Pieciak . |
| 4,767,426 | 8/1988 | Daly et al. .................. 210/497.01 |
| 4,838,905 | 6/1989 | Billiet et al. . |
| 4,882,056 | 11/1989 | Degen et al. . |

FOREIGN PATENT DOCUMENTS

| | | |
|---|---|---|
| 88/06058 | 8/1988 | European Pat. Off. . |
| 17 51 231 | 8/1957 | Germany . |
| 18 19 348 | 10/1960 | Germany . |
| 61890 | 5/1968 | Germany . |
| 2126080 | 11/1972 | Germany . |
| 77 34 224 | 8/1978 | Germany . |
| 91 05 786.8 | 9/1991 | Germany . |
| 3729955 | 6/1992 | Germany . |
| 93 05 442.4 | 8/1993 | Germany . |
| 2007992 | 5/1979 | United Kingdom . |
| 2165769 | 4/1986 | United Kingdom . |
| 2217622 | 11/1989 | United Kingdom . |

Primary Examiner—W. L. Walker
Attorney, Agent, or Firm—Evenson, McKeown, Edwards & Lenahan P.L.L.C.

[57] ABSTRACT

A filter element having a first tube 2 and a second tube 3, the outer circumferential surface of the first tube 2 being surrounded by a nonwoven layer 4, and the second tube 3 surrounding the first tube 2. On the outer periphery of the second tube 3 there is a yarn and/or paper winding 5, and a shrink tube 6 presses the yarn and/or paper winding 5 against the second tube.

9 Claims, 1 Drawing Sheet

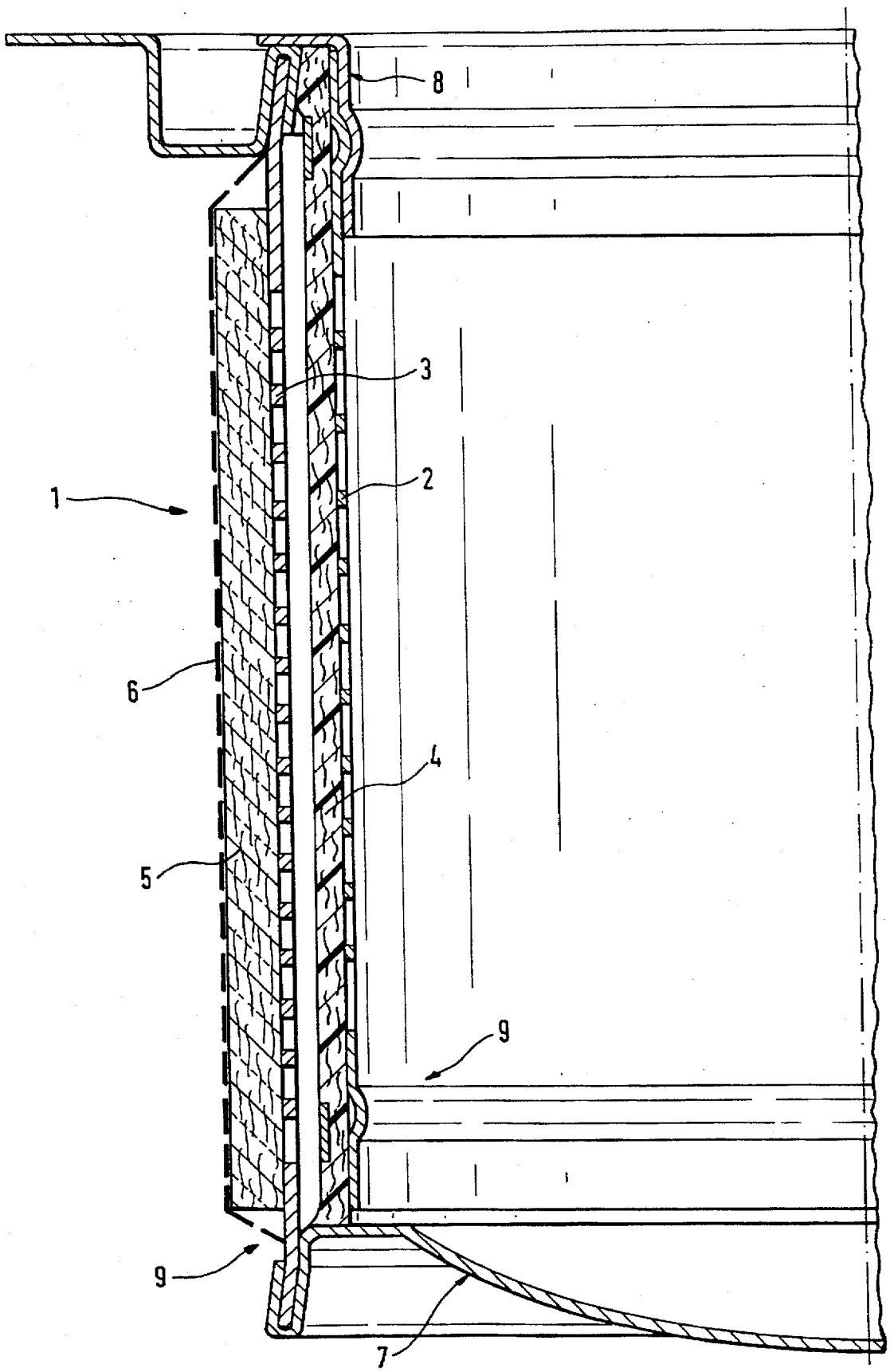

FILTER ELEMENT HAVING A NONWOVEN LAYER AND A PERMEABLE SHRINK TUBE

BACKGROUND OF THE INVENTION

The invention relates to a filter element, for example, for separating oil from air. Filter elements of this general type are known, for example, from U.S. Pat. No. 4,882,056, the disclosure of which is incorporated herein by reference. If a filter element of this type is used, for example, for the separation of liquids from a gas, it is disadvantageous that the degree of separation is not a great as great one would desire. One possible approach to overcome this deficiency would be to increase the surface area of the filter element. Such an increase in area, however, would lead either to an increase in structural height, or to an increase in the pressure loss across the filter.

SUMMARY OF THE INVENTION

It is the object of the invention to provide an improved filter element of the kind referred to above.

Another object of the invention is to provide a filter element which is free of adhesives and which after use can readily be separated into its components.

A further object of the invention is to provide a filter element which will have a low pressure loss and yet produce a high degree of separation.

These and other objects have been achieved in accordance with the present invention by providing a filter element comprising a first permeable tube, a nonwoven layer supported on the outer periphery of the first tube, a second permeable tube surrounding the first tube and nonwoven layer, a winding supported on the outer periphery of the second tube, the winding comprising a yarn winding or at least two layers of filter paper or both, and a permeable shrink tube surrounding the winding and holding the winding on the second tube.

In accordance with the present invention a filter element is produced which comprises a first tube and a second tube, the outer surface of the first tube being surrounded by a nonwoven layer, and the second tube surrounding the first tube, while the outside surface of the second tube bears a winding of yarn and/or at least two layers of filter paper as a paper winding, and a shrink tube or shrinkable sleeve presses and holds the yarn winding and/or the paper winding against the second tube. Shrinkable tubes or sleeves are known, for example, from U.S. Pat. No. 4,838,905, the disclosure of which is incorporated herein by reference.

In the separation of oil from air, for example, the yarn winding provides a relatively large amount of filter surface. The pressure loss occurring in the yarn winding is comparatively low. The use of the shrink tube eliminates the adhesive which causes problems in disposal. The combination of the nonwoven web and the yarn winding assures an optimum separation with low pressure loss.

In one advantageous embodiment of the invention, the nonwoven layer is longer than the first tube. This assures that, in the assembled state, the ends of the nonwoven layer will be compressed so that bypass air currents are effectively prevented.

Furthermore, provision can advantageously be made for the first and/or second tube to have areas at their ends which are radially impermeable. This also assists in assuring that in the assembled state bypass air currents will be prevented.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE FIGURE

The invention will be described in further detail hereinafter with reference to illustrative preferred embodiments shown in the accompanying drawings in which:

The sole figure shows a sectional view through a filter element embodying the present invention.

DETAILED DESCRIPTION OF PREFERRED EMBODIMENTS

The filter element 1 comprises a first tube 2 and a second tube 3. The first tube 2 is surrounded by a nonwoven layer 4, e.g., a polyester fleece. The second tube 3 comprises has a yarn winding 5, for example, of glass fiber yarn or synthetic resin microfiber yarn. Alternatively, the outer winding 5 could comprise a paper winding formed from at least two layers of filter paper. The yarn and/or paper winding 5 is affixed to the second tube 3 by means of a permeable shrink tube or shrinkable sleeve 6. Permeable sleeve 6 may be made of a fabric containing heat-shrinkable polyethylene and/or polypropylene filaments or yarns. The tube 2 together with the fleece surrounding it is held concentrically in the tube 3. The fleece situated in the tube 2 is longer axially than tube 2, so that in the assembled state no unfiltered air can pass around the fleece to the clean air side of the filter. The tube 2, which in itself is loose, is then clamped in the housing by means of cover 7 and mounting flange 8.

Both of the tubes 2 and 3 may be formed, for example, of perforated sheet metal. At the axial extremities of each of the tubes 2 and 3 are unperforated areas 9 which assist in preventing unfiltered air from bypassing the filter elements to the clean air side of the filter.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A filter element comprising a first permeable tube, a nonwoven layer supported on the outer periphery of said first permeable tube, a second permeable tube surrounding said first tube and nonwoven layer, a winding supported on the outer periphery of said second tube, said winding comprising at least one winding structure selected from the group consisting of (1) a yarn winding and (2) at least two layers of filter paper, and a permeable shrink tube surrounding said winding and holding said winding on said second tube; wherein the nonwoven layer has a greater axial length than the first permeable tube and is axially compressed when the filter element is installed in a filter.

2. A filter element according to claim 1, further comprising a lid attached at one axial end of said first and second tubes to close the tube ends.

3. A filter element according to claim 1, further comprising a mounting flange at one axial end of said first and second tubes.

4. A filter element according to claim 1, wherein the first tube is permeable in a radial direction.

5. A filter element according to claim 1, wherein the second tube is permeable in a radial direction.

6. A filter element according to claim 1, wherein the winding is a yarn winding of yarn made from fibers selected from the group consisting of glass fibers and synthetic resin microfibers.

7. A filter element according to claim 1, wherein the winding is a paper winding formed of at least two layers of gas permeable paper.

8. A filter element according to claim 1, wherein the nonwoven layer comprises a polyester fleece.

9. A filter element according to claim 1, wherein at least one of said first and second tubes has radially impermeable areas adjacent its axial ends.

* * * * *